(12) United States Patent
Funayama et al.

(10) Patent No.: US 8,270,112 B2
(45) Date of Patent: Sep. 18, 2012

(54) MAGNETIC HEAD WITH SPIN OSCILLATION DEVICE(S) AND MAGNETIC RECORDING DEVICE

(75) Inventors: Tomomi Funayama, Tokorozawa (JP);
Kenichiro Yamada, Tokyo (JP);
Masayuki Takagishi, Kunitachi (JP);
Masahiro Takashita, Yokohama (JP);
Mariko Shimizu, Yokohama (JP);
Junichi Akiyama, Kawasaki (JP);
Hitoshi Iwasaki, Yokosuka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 935 days.

(21) Appl. No.: 12/232,392

(22) Filed: Sep. 16, 2008

(65) Prior Publication Data
US 2009/0080120 A1 Mar. 26, 2009

(30) Foreign Application Priority Data
Sep. 25, 2007 (JP) ................ 2007-247169

(51) Int. Cl.
*G11B 5/127* (2006.01)

(52) U.S. Cl. ........... 360/125.31; 360/125.3; 360/125.71; 360/125.74

(58) Field of Classification Search ........................ None
See application file for complete search history.

(56) References Cited

U.S. PATENT DOCUMENTS

| | | |
|---|---|---|
| 4,103,315 A | 7/1978 | Hempstead et al. |
| 4,945,528 A | 7/1990 | Crasemann |
| 5,695,864 A | 12/1997 | Slonczewski |
| 5,748,399 A | 5/1998 | Gill |
| 5,768,066 A | 6/1998 | Akiyama et al. |
| 5,898,546 A | 4/1999 | Kanai et al. |
| 5,920,447 A | 7/1999 | Sakata et al. |
| 6,011,664 A | 1/2000 | Kryder et al. |
| 6,153,062 A | 11/2000 | Saito et al. |
| 6,278,576 B1 | 8/2001 | Ogata et al. |
| 6,519,119 B1 | 2/2003 | van der Heijden et al. |
| 6,580,589 B1 | 6/2003 | Gill |
| 6,583,969 B1 | 6/2003 | Pinarbasi |
| 6,621,664 B1 | 9/2003 | Trindade et al. |
| 6,697,231 B1 | 2/2004 | Kikuiri |
| 6,785,092 B2 * | 8/2004 | Covington et al. ...... 360/125.45 |
| 6,809,900 B2 * | 10/2004 | Covington ............... 360/125.01 |
| 6,927,952 B2 | 8/2005 | Shimizu et al. |
| 6,937,446 B2 | 8/2005 | Kamiguchi et al. |
| 6,977,108 B2 | 12/2005 | Hieda et al. |

(Continued)

FOREIGN PATENT DOCUMENTS
JP 64-070947 3/1989
(Continued)

OTHER PUBLICATIONS

X. Zhu and J.-G. Zhu, "Bias-Field-Free Microwave Oscillator Driven by Perpendicularly Polarized Spin Current," IEEE Trans. Magn. vol. 42, p. 2670 (2006).

(Continued)

*Primary Examiner* — Kevin Bernatz
(74) *Attorney, Agent, or Firm* — Nixon & Vanderhye, P.C.

(57) ABSTRACT

It is made possible to provide a magnetic head that generates a sufficient high-frequency magnetic field for assisting recording operations, and a magnetic recording device that includes the magnetic head. A magnetic head includes: a recording magnetic pole; a return yoke magnetically coupled to the recording magnetic pole; and at least two spin torque oscillators provided near the recording magnetic pole.

16 Claims, 17 Drawing Sheets

U.S. PATENT DOCUMENTS

| | | | |
|---|---|---|---|
| 6,982,845 B2 | 1/2006 | Kai et al. |
| 7,106,555 B2 | 9/2006 | Kikuiri et al. |
| 7,119,990 B2 | 10/2006 | Bajorek et al. |
| 7,145,752 B2 | 12/2006 | Ueda et al. |
| 7,154,707 B2 | 12/2006 | Watabe et al. |
| 7,256,955 B2 | 8/2007 | Pokhil et al. |
| 7,322,095 B2 | 1/2008 | Guan et al. |
| 7,397,633 B2 | 7/2008 | Xue et al. |
| 7,466,525 B2 | 12/2008 | Hasegawa et al. |
| 7,471,491 B2 | 12/2008 | Sato et al. |
| 7,473,478 B2 | 1/2009 | Sbiaa et al. |
| 7,504,898 B2 * | 3/2009 | Fukuzawa et al. | 331/96 |
| 7,532,433 B2 | 5/2009 | Kawato et al. |
| 7,532,434 B1 | 5/2009 | Schrek et al. |
| 7,593,185 B2 | 9/2009 | Yazawa |
| 7,616,412 B2 | 11/2009 | Zhu et al. |
| 7,639,454 B2 | 12/2009 | Lim et al. |
| 7,675,129 B2 | 3/2010 | Inomata et al. |
| 7,724,469 B2 | 5/2010 | Gao et al. |
| 7,732,881 B2 | 6/2010 | Wang |
| 7,764,136 B2 | 7/2010 | Suzuki |
| 7,791,829 B2 | 9/2010 | Takeo et al. |
| 7,808,330 B2 | 10/2010 | Fukuzawa et al. |
| 7,911,882 B2 | 3/2011 | Shimazawa et al. |
| 7,957,098 B2 | 6/2011 | Yamada et al. |
| 8,164,854 B2 * | 4/2012 | Takagishi et al. | 360/125.31 |
| 2001/0017752 A1 | 8/2001 | Hoshiya et al. |
| 2002/0006013 A1 | 1/2002 | Sato et al. |
| 2002/0051330 A1 | 5/2002 | Heijden et al. |
| 2002/0075595 A1 | 6/2002 | Sato et al. |
| 2002/0136927 A1 | 9/2002 | Hieda et al. |
| 2003/0026040 A1 | 2/2003 | Covington et al. |
| 2003/0090844 A1 | 5/2003 | Shimizu et al. |
| 2004/0150912 A1 | 8/2004 | Kawato et al. |
| 2004/0190197 A1 | 9/2004 | Watabe et al. |
| 2004/0228045 A1 | 11/2004 | Hasegawa et al. |
| 2005/0023938 A1 | 2/2005 | Sato et al. |
| 2005/0105213 A1 | 5/2005 | Takeo et al. |
| 2005/0110004 A1 | 5/2005 | Parkin et al. |
| 2005/0207050 A1 | 9/2005 | Pokhil |
| 2005/0219771 A1 * | 10/2005 | Sato et al. | 360/324.2 |
| 2006/0171051 A1 | 8/2006 | Wachenschwanz et al. |
| 2006/0198047 A1 * | 9/2006 | Xue et al. | 360/126 |
| 2006/0221507 A1 | 10/2006 | Sato et al. |
| 2007/0063237 A1 | 3/2007 | Huai et al. |
| 2007/0109147 A1 | 5/2007 | Fukuzawa et al. |
| 2008/0019040 A1 | 1/2008 | Zhu et al. |
| 2008/0112087 A1 | 5/2008 | Clinton et al. |
| 2008/0117545 A1 * | 5/2008 | Batra et al. | 360/125.01 |
| 2008/0129401 A1 | 6/2008 | Fukuzawa et al. |
| 2008/0137224 A1 * | 6/2008 | Gao et al. | 360/55 |
| 2008/0150643 A1 | 6/2008 | Suzuki et al. |
| 2008/0218891 A1 | 9/2008 | Gubbins et al. |
| 2008/0268291 A1 | 10/2008 | Akiyama et al. |
| 2008/0304176 A1 * | 12/2008 | Takagishi et al. | 360/86 |
| 2009/0052095 A1 | 2/2009 | Yamada et al. |
| 2009/0059417 A1 | 3/2009 | Takeo et al. |
| 2009/0059418 A1 | 3/2009 | Takeo et al. |
| 2009/0059423 A1 | 3/2009 | Yamada et al. |
| 2009/0080105 A1 | 3/2009 | Takashita et al. |
| 2009/0080106 A1 * | 3/2009 | Shimizu et al. | 360/75 |
| 2009/0080120 A1 | 3/2009 | Funayama et al. |
| 2009/0088095 A1 | 4/2009 | Kayano et al. |
| 2009/0097167 A1 | 4/2009 | Sato et al. |
| 2009/0097169 A1 | 4/2009 | Sato et al. |
| 2009/0115541 A1 * | 5/2009 | Persson et al. | 331/135 |
| 2009/0225465 A1 | 9/2009 | Iwasaki et al. |
| 2009/0257151 A1 | 10/2009 | Zhang et al. |
| 2009/0262457 A1 * | 10/2009 | Rivkin et al. | 360/110 |
| 2009/0316303 A1 | 12/2009 | Yamada et al. |
| 2009/0316304 A1 | 12/2009 | Funayama et al. |
| 2010/0007992 A1 | 1/2010 | Yamada et al. |
| 2010/0134922 A1 | 6/2010 | Yamada et al. |
| 2010/0220415 A1 | 9/2010 | Yamada et al. |
| 2011/0038080 A1 | 2/2011 | Alex et al. |
| 2011/0205655 A1 | 8/2011 | Shimizu et al. |
| 2011/0300409 A1 | 12/2011 | Yamada et al. |

FOREIGN PATENT DOCUMENTS

| | | |
|---|---|---|
| JP | 05-20635 | 1/1993 |
| JP | 07-244801 | 9/1995 |
| JP | 2002-100005 | 4/2002 |
| JP | 2002-208744 | 7/2002 |
| JP | 2002-279616 | 9/2002 |
| JP | 2004-192744 | 7/2004 |
| JP | 2004-207707 | 7/2004 |
| JP | 2004-295987 | 10/2004 |
| JP | 2005-108315 | 4/2005 |
| JP | 2005-525663 | 8/2005 |
| JP | 2005-285242 | 10/2005 |
| JP | 2005-310363 | 11/2005 |
| JP | 2006-147023 | 6/2006 |
| JP | 2006-209960 | 8/2006 |
| JP | 2006-209964 | 8/2006 |
| JP | 2006-286855 | 10/2006 |
| JP | 3833512 | 10/2006 |
| JP | 2007-012264 | 1/2007 |
| JP | 2007-035251 | 2/2007 |
| JP | 2007-124340 | 5/2007 |
| JP | 2007-184923 | 7/2007 |
| JP | 2007-193906 | 8/2007 |
| JP | 2008-123669 | 5/2008 |
| JP | 2008-176908 | 7/2008 |
| KR | 1020030039289 | 5/2003 |
| WO | 2006-101040 | 9/2006 |

OTHER PUBLICATIONS

Yamada et al., U.S. Appl. No. 12/153,490, filed May 20, 2008.
Takeo et al., U.S. Appl. No. 12/196,628, filed Aug. 22, 2008.
Iwasaki et al., U.S. Appl. No. 12/232,014, filed Sep. 9, 2008.
Takashita et al., U.S. Appl. No. 12/232,391, filed Sep. 16, 2008.
Shimizu et al., U.S. Appl. No. 12/232,469, filed Sep. 17, 2008.
Yamada et al., U.S. Appl. No. 12/780,269, filed May 13, 2010.
Digest of the 18$^{th}$ Magnetic Recording Conference TMRC-2007 B6, Jian-Gang Zhu and Xiaochun Zhu "Microwave Assisted Magnetic Recording (MAMR)", May 2007.
U.S. Appl. No. 12/155,329.
U.S. Appl. No. 12/155,473.
Maat et al., "Magnetotransport properties and spin-torque effects in current perpendicular to the plane spin valves with Co-Fe-Al magnetic layers", Journal of Applied Physics 101, 093905; May 9, 2007.
Akiyama et al., U.S. Appl. No. 12/109,760, filed Apr. 25, 2008.
Takeo et al., U.S. Appl. No. 12/196,841, filed Aug. 22, 2008.
Yamada et al., U.S. Appl. No. 12/382,940, filed Mar. 26, 2009.
Yamada et al., U.S. Appl. No. 13/214,012, filed Aug. 19, 2011.
Yamada et al., U.S. Appl. No. 13/214,033, filed Aug. 19, 2011.
Office Action dated Oct. 28, 2011 in JP Application No. 2007-247169 and English-language translation of same.

* cited by examiner

MAGNETIC HEAD WITH SPIN OSCILLATION DEVICE(S) AND MAGNETIC RECORDING DEVICE

CROSS-REFERENCE TO RELATED APPLICATION

This application is based upon and claims the benefit of priority from prior Japanese Patent Application No. 2007-247169 filed on Sep. 25, 2007 in Japan, the entire contents of which are incorporated herein by reference.

BACKGROUND OF THE INVENTION

1. Field of the Invention

The present invention relates to a magnetic head that records signals on a magnetic recording medium, and a magnetic recording device.

2. Related Art

In recent years, magnetic recording devices such as hard disk devices have been rapidly becoming smaller and having higher densities, and this trend is expected to continue in the future. To achieve higher density in magnetic recording, it is necessary to narrow the recording track width to increase the recording track density. It is also necessary to increase the recording density in the longitudinal direction of the track, which is the line recording density.

However, as the recording density becomes higher in in-plane longitudinal recording, a larger diamagnetic field is generated. This leads to a decrease in reproduction outputs, and hinders stable recording. To solve those problems, vertical recording methods have been suggested and put into practical use. By a vertical recording method, recording is performed by magnetizing a magnetic recording medium in a direction perpendicular to the film plane. By such a method, the influence of a diamagnetic field is made smaller even when the recording density is increased, and higher recording density can be achieved, compared with a case where a longitudinal recording method is utilized.

A magnetic recording head that can be used in a magnetic disk device of a vertical recording type is of a single-pole type or a shielded-pole type, and is different from a ring-like head that is conventionally used in in-plane recording. A magnetic recording medium to be used in this case is a double-layer magnetic recording medium having a soft-magnetic backing layer.

Conventionally, an AMR head that utilizes anisotropic magnetoresistance effects (AMR) or a spin-valve GMR head that utilizes giant magnetoresistance effects (GMR) and has higher sensitivity has been used to reproduce signals recorded on a magnetic recording medium. Also, magnetic heads that utilize tunnel magnetoresistance effects (TMR) or CPP (Current Perpendicular-to-the-Plane)-GMR elements and have higher sensitivity are also being developed and put into practical use. In each of those magnetic heads, a sense current is applied in a direction perpendicular to the film plane.

Meanwhile, the following phenomenon has been observed. When TMR elements or CPP-GMR elements having spin-valve structures are made smaller in size and have a certain amount or more of current applied thereto, the magnetization of the free layer of each element has ferromagnetic resonance, and oscillates at a fixed frequency equal to or higher than 1 GHz. With the use of this phenomenon, spin torque oscillators of several GHz to several tens of GHz have been suggested (see U.S. Patent Application Publication Nos. 2005/0023938 and 2005/0219771, for example).

Also, the following high-frequency assist recording has been suggested. In this high-frequency assist recording, a high-frequency magnetic field generated by each spin torque oscillator is utilized in an auxiliary manner, so as to enable writing with a small recording magnetic field.

However, in a case where a high-frequency magnetic field generated by each spin torque oscillator is used in an auxiliary manner, the high-frequency assist magnetic field needs to be generated at a portion closer to the write (trailing) shield from a region near the main magnetic pole of the recording head. Therefore, spin torque oscillators are formed in the magnetic gap of the recording head. If an actual recording operation is performed, the operations of the spin torque oscillators become unstable due to the magnetic flux that are short-circuited and flow from the main magnetic pole to the write shield. As a result, a sufficient high-frequency magnetic field for assisting recording operations cannot be generated.

SUMMARY OF THE INVENTION

The present invention has been made in view of these circumstances, and an object thereof is to provide a magnetic head that can generate a sufficient high-frequency magnetic field for assisting recording operations, and a magnetic recording device that includes the recording head.

A magnetic head according to a first aspect of the present invention includes: a recording magnetic pole; a return yoke magnetically coupled to the recording magnetic pole; and at least two spin torque oscillators provided near the recording magnetic pole.

A magnetic recording device according to a second aspect of the present invention includes: the magnetic head according to the first aspect.

DETAILED DESCRIPTION OF THE INVENTION

The following is a description of embodiments of the present invention, with reference to the accompanying drawings.

(First Embodiment)

Figure 1:
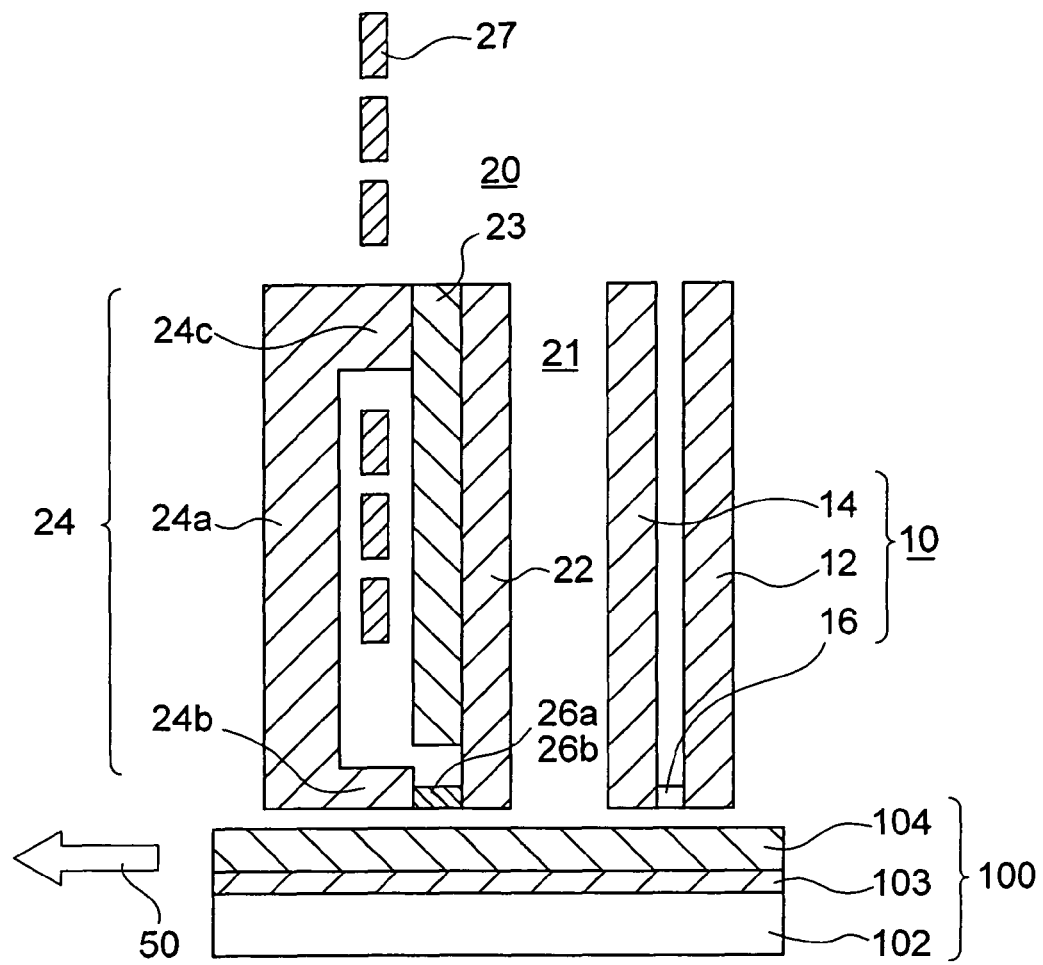
FIG. 1 is a cross-sectional view of a magnetic head according to a first embodiment, taken in the track longitudinal direction.
Figure 2:
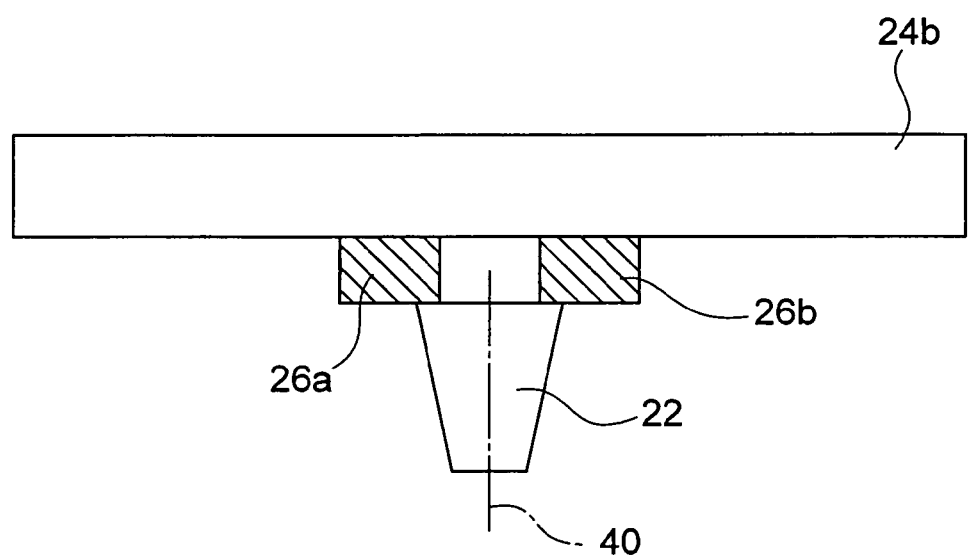
FIG. 2 is a plan view of the magnetic head of the first embodiment, seen from the magnetic recording medium side.

FIGS. 1 and 2 illustrate a magnetic head in accordance with a first embodiment of the present invention. FIG. 1 is a cross-sectional view of the magnetic head of this embodiment, taken along a plane that is perpendicular to the medium facing plane and extends in a direction (the track longitudinal direction) parallel to the moving direction of the magnetic recording medium. FIG. 2 is a plan view of the magnetic head of this embodiment, seen from the magnetic recording medium side.

The magnetic head of this embodiment includes a reproducing head unit 10 and a writing head unit 20. The reproducing head unit 10 includes a magnetic shield 12, a magnetic shield 14, and a magnetic reproducing element 16 interposed between the magnetic shield 12 and the magnetic shield 14. The magnetic reproducing element 16 may be a GMR (Giant Magneto-Resistive effect) element or a TMR (Tunneling Magneto-Resistive effect) element. The magnetic reproducing element 16 is located between the end portions of the magnetic shields 12 and 14 on the side of a magnetic recording medium 100. The magnetic recording medium 100 includes a magnetic recording medium substrate 102, a soft magnetic layer 103 provided on the magnetic recording medium substrate 102, and a magnetic recording layer 104 provided on the soft magnetic layer 103. The magnetic reproducing element 16 is located in the vicinity of the magnetic recording layer 104 of the magnetic recording medium 100, and forms a magnetic circuit with a region (a read-out region) of the magnetic recording layer 104 located immediately below the magnetic reproducing element 16. This magnetic circuit has a magnetic resistance that varies with the direction of magnetization recorded in the read-out region of the magnetic recording layer 104. The magnetic reproducing element 16 detects the difference in the magnetic resistance, so as to read (reproduce) the direction of magnetization (recorded information) recorded on the magnetic recording layer 104. In FIG. 1, the moving direction of the magnetic recording medium 100 is indicated by an arrow 50.

The writing head unit 20 includes a magnetic core 21 formed with a main magnetic pole 22, an auxiliary yoke 23, and a return yoke (a magnetic shield) 24, an electromagnetic coil 27 for exciting the magnetic core 21, and two spin torque oscillators 26a and 26b. The main magnetic pole 22 and the auxiliary yoke 23 form a recording magnetic pole. The return yoke 24 includes a body portion 24a, a front portion 24b that is connected to the end portion of the body portion 24a on the side of the magnetic recording medium 100 and serves as a write shield, and a rear portion 24c that is connected to the end portion of the body portion 24a on the opposite side from the magnetic recording medium 100. The write shield 24b and the body portion 24a form an auxiliary magnetic pole. The rear portion 24c is magnetically connected to the main magnetic pole 22 via the auxiliary yoke 23. In other words, the rear portion 24c links the recording magnetic pole formed with the main magnetic pole 22 and the auxiliary yoke 23, to the auxiliary magnetic pole formed with the write shield 24b and the body portion 24a. The space between the main magnetic pole 22 and the write shield 24b serves as a magnetic gap. The electromagnetic coil 27 is placed to surround or circle around the rear portion 24c of the return yoke 24, and excites the magnetic core 21.

The spin torque oscillators 26a and 26b are provided between the write shield 24b and the end portion of the main magnetic pole 22 on the side of the magnetic recording medium 100 (see FIGS. 1 and 2). In other words, the spin torque oscillators 26a and 26b are provided on the trailing side of the main magnetic pole 22, and are provided between a face of the recording magnetic pole 22 on a side of the magnetic gap and a face of the return yoke 24b on a side of the magnetic gap. In this embodiment, the spin torque oscillators 26a and 26b are located at certain distances from the center line 40 of the recording magnetic pole 22 that extends across the magnetic gap between the recording magnetic pole 22 and the write shield 24b, and are arranged symmetrically about the center line 40.

The magnetic head of this embodiment is a so-called shielded structure, and the write magnetic field becomes stronger at the end portion of the recording magnetic pole 22 on the side of the write shield 24b. To induce a high-frequency magnetic field for assistance at this portion, the spin torque oscillators 26a and 26b are placed between the recording magnetic pole 22 and the write shield 24b, being located at certain distances from the center line 40 of the recording magnetic pole 22 and being symmetrical about the center line 40.

Figure 3:
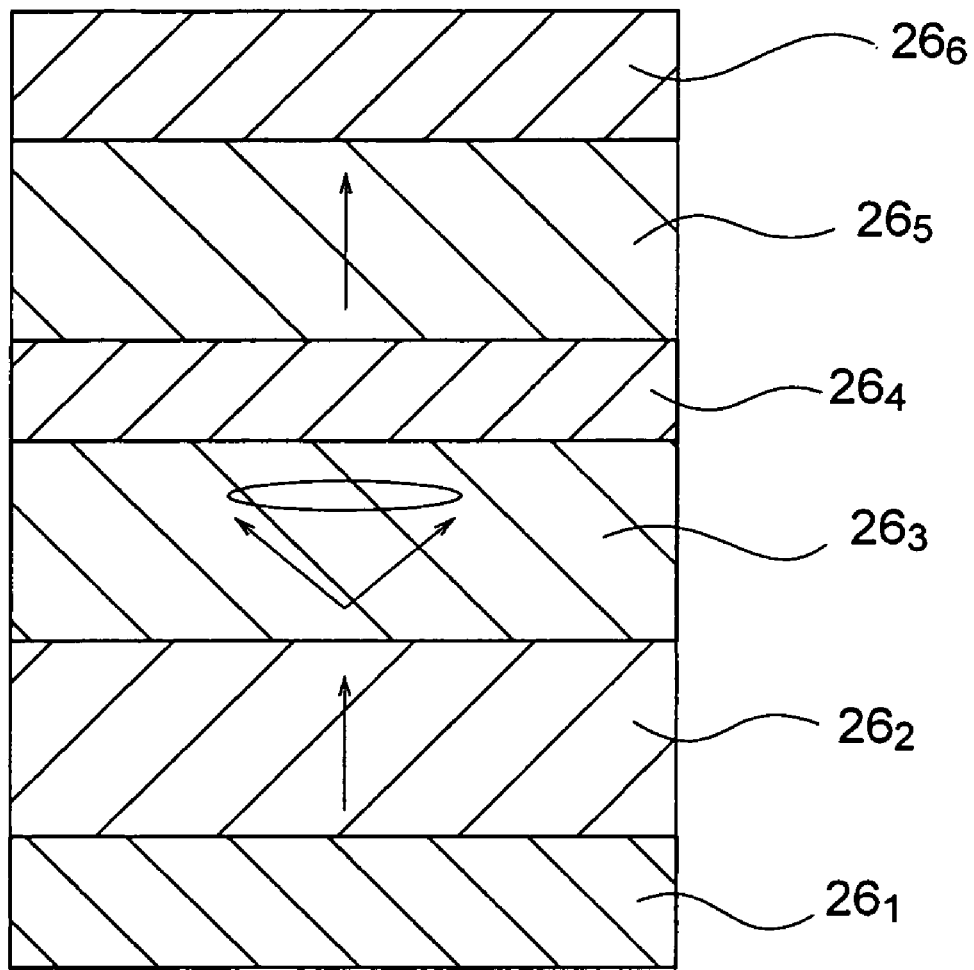
FIG. 3 is a cross-sectional view of a first specific example of a spin torque oscillator.

FIG. 3 shows a first specific example of the spin torque oscillators 26a and 26b used in the magnetic head of this embodiment. FIG. 3 is a cross-sectional view of a spin torque oscillator of the first specific example. Each of the spin torque oscillators has a stacked structure that includes a first electrode $26_1$, a first magnetic layer $26_2$, a second magnetic layer $26_3$, an intermediate layer $26_4$, a third magnetic layer $26_5$, and a second electrode $26_6$. The first magnetic layer $26_2$ is a layer that applies a magnetic bias to the second magnetic layer $26_3$, and is also referred to as the bias layer. In each spin torque oscillator of the first specific example, the magnetization direction of each of the first to third magnetic layers is substantially perpendicular to the film plane.

The bias layer $26_2$ may be made of a magnetic substance with a large magnetic anisotropic energy, such as CoPt, FePt, or SmCo. The second magnetic layer $26_3$ is a layer that oscillates at the time of actuation of its magnetization, and is also referred to as the oscillation layer. The oscillation layer $26_3$ may be made of a magnetic metal such as Fe, Co, or Ni, or an alloy containing one of those metals. The intermediate layer $26_4$ may be made of a metal with high conductivity, such as Cu, Ag, or Au, or may be a tunnel insulating film made of MgO, AlOx, TiOx, or the like. The third magnetic layer $26_5$ is a layer that is designed to supply spin-polarized electrons to the oscillation layer $26_3$ as the second magnetic layer. Accordingly, the third magnetic layer $26_5$ is also referred to as the spin injection layer. The spin injection layer $26_5$ may be formed with stacked films consisting of an antiferromagnetic substance such as IrMn or PtMn, and a magnetic substance with a large magnetic anisotropic energy, such as CoPt, FePt, or SmCo, a magnetic metal such as Fe, Co, Ni, or an alloy containing one of those metals.

When a current of a certain size or larger is applied to this spin torque oscillator, the magnetization of the oscillation layer $26_3$ oscillates at a certain frequency, due to the influence of the electrons spin-polarized in the spin injection layer $26_5$. The magnetization that oscillates at this point generates a high-frequency magnetic field. If the magnetic flux components that are short-circuited and flow from the recording magnetic pole 22 to the write shield 24b are applied too strongly onto the spin torque oscillator, the operation of the spin torque oscillator becomes unstable. To avoid this problem in this embodiment, the spin torque oscillators are placed at certain distances from the center portion having the strongest magnetic flux components, as shown in FIG. 2. With this arrangement, instability due to the magnetic flux applied from the recording magnetic pole 22 onto the spin torque oscillators 26a and 26b can be eliminated, and a high-frequency magnetic field that is sufficient for assistance can be generated.

In this embodiment, each of the spin torque oscillators 26a and 26b has one of the first and second electrodes $26_1$ and $26_2$ electrically connected to the main magnetic pole 22, and has the other electrode electrically connected to the write shield 24b.

Figure 4:
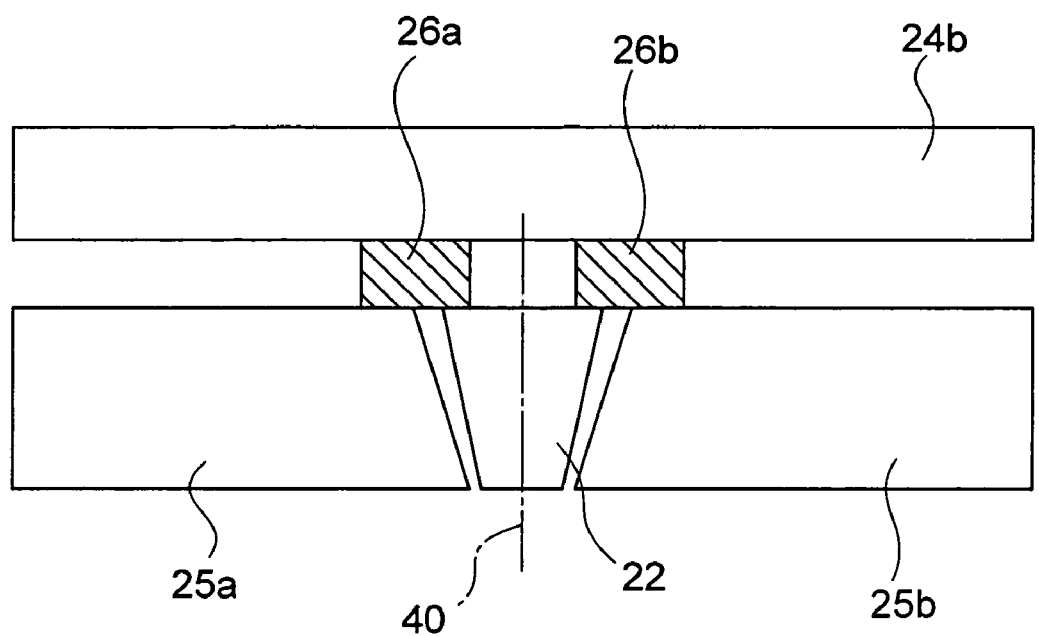
FIG. 4 is a plan view of the magnetic head of a first modification of the first embodiment, seen from the magnetic recording medium side.

FIG. 4 illustrates a magnetic head in accordance with a modification of this embodiment. FIG. 4 is a plan view of the magnetic head in accordance with this modification, seen from the magnetic recording medium side. The magnetic head in accordance with this modification has side shields 25a and 25b on two sides of the main magnetic pole 22, so as to prevent write fringe of the recording head. In this modification, one of the two electrodes of each of the spin torque oscillators 26a and 26b (the electrode $26_6$ in FIG. 3, for example) can be shared with the side shields. If the side of the write shield 24b is used as a common GND terminal, for example, a current can be supplied to the two spin torque oscillators 26a and 26b separately from each other, and the currents can be adjusted so as to provide the optimum oscillation conditions for each spin torque oscillator. Thus, even if there are variations at the time of manufacturing, the currents are adjusted to achieve stable operations.

Figure 5:
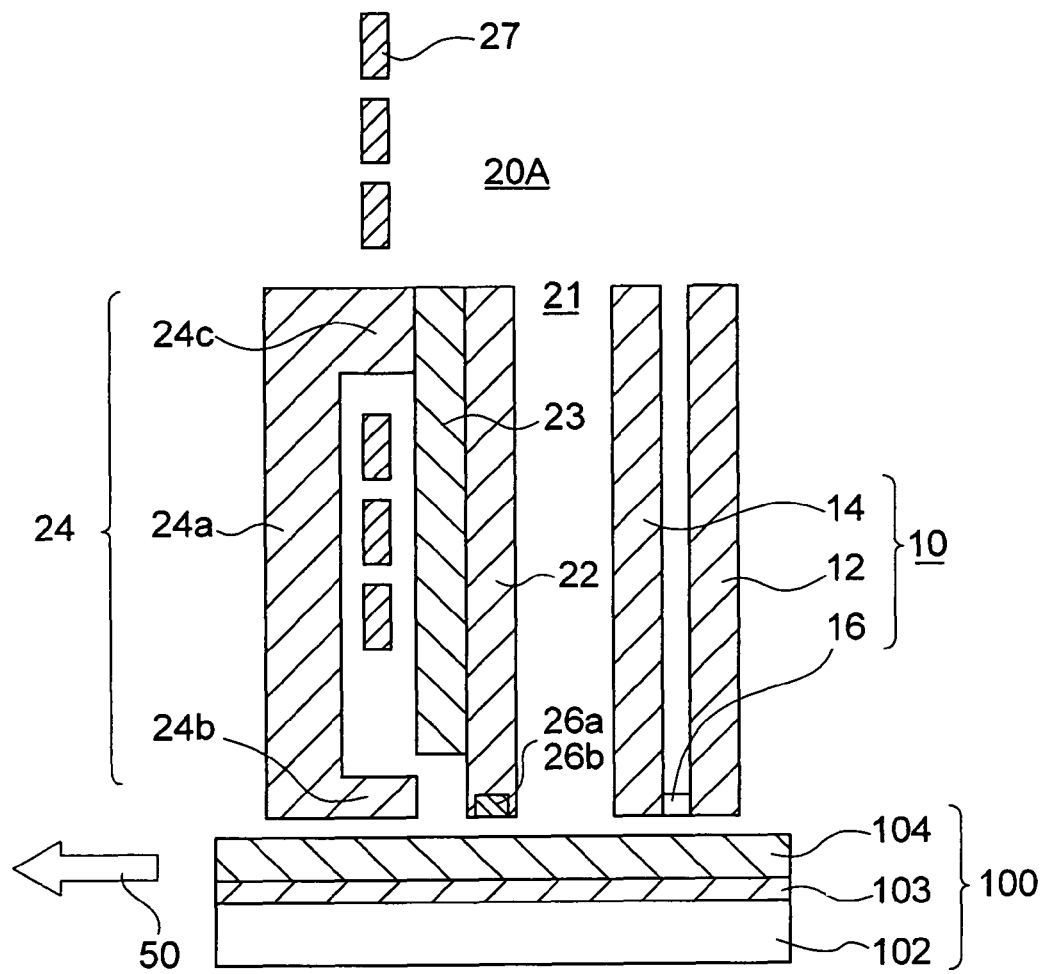
FIG. 5 is a cross-sectional view of a magnetic head according to a second embodiment, taken in the track longitudinal direction.
Figure 6:
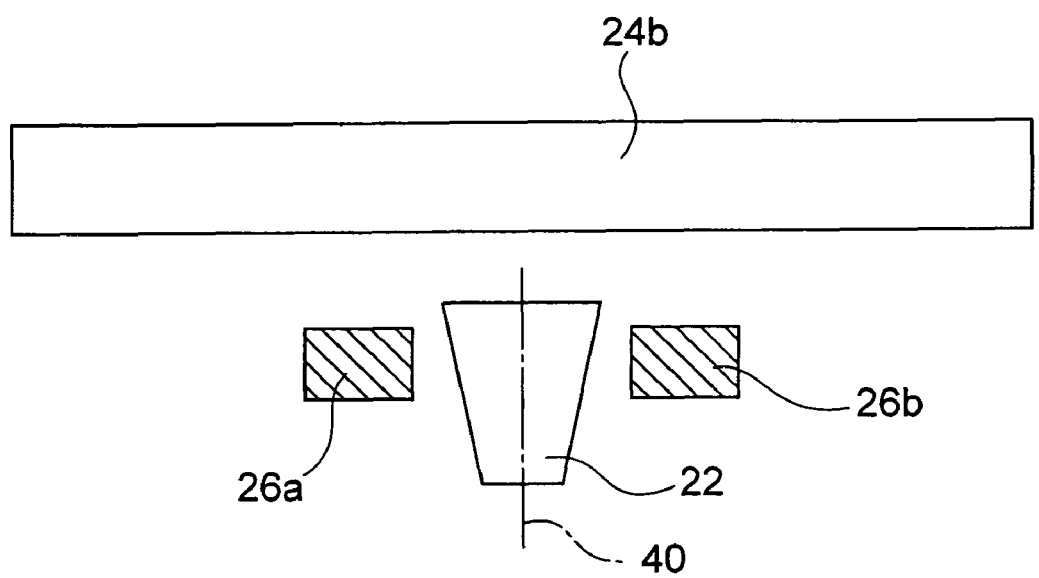
FIG. 6 is a plan view of the magnetic head of the second embodiment, seen from the magnetic recording medium side.

As described above, this embodiment and its modification can provide a magnetic head that generates a sufficient high-frequency magnetic field for assisting recording operations.
Second Embodiment FIGS. 5 and 6 illustrate a magnetic head in accordance with a second embodiment of the present invention. FIG. 5 is a cross-sectional view of the magnetic head of this embodiment, taken along a plane that is perpendicular to the medium facing plane and extends in a direction (the track longitudinal direction) parallel to the moving direction of the magnetic recording medium. FIG. 6 is a plan view of the magnetic head of this embodiment, seen from the magnetic recording medium side.

The magnetic head of this embodiment is the same as the magnetic head of the first embodiment shown in FIGS. 1 and 2, except that the writing head unit 20 is replaced with a writing head unit 20A. As shown in FIGS. 5 and 6, the writing head unit 20A differs from the writing head unit 20 of the first embodiment in that the spin torque oscillators 26a and 26b are provided on the two sides of the main magnetic pole (the recording magnetic pole) 22. The spin torque oscillators 26a and 26b are located at certain distances from the center line 40 of the recording magnetic pole 22 that extends across the magnetic gap between the recording magnetic pole 22 and the write shield 24a, and are arranged symmetrically about the center line 40. In other words, the spin torque oscillators 26a and 26b are provided in the vicinities of two side faces (tapered faces in FIG. 6) that exclude the first face of the recording magnetic pole 22 on the side of the magnetic gap and the second face of the recording magnetic pole on the opposite side from the magnetic gap. In FIG. 5, the moving direction of the magnetic recording medium 100 is indicated by an arrow 50.

The magnetic head of this embodiment is a so-called shielded structure. If the magnetic flux components that are short-circuited and flow from the main magnetic pole 22 to the write shield 24b are applied too strongly onto the spin torque oscillators, the operations of the spin torque oscillators become unstable. To avoid this problem in this embodiment, the two spin torque oscillators 26a and 26b are placed at certain distances from the portion between the main magnetic pole 22 and the write shield 24b where the magnetic flux components are strong. The two spin torque oscillators 26a and 26b are also placed in the vicinity of the main magnetic pole 22, and are arranged symmetrically about the center line 40 of the main magnetic pole 22. With this arrangement, a high-frequency magnetic field required for assisting recording operations can be generated.

As described above, this embodiment can provide a magnetic head that generates a sufficient high-frequency magnetic field for assisting recording operations.

In this embodiment, each of the spin torque oscillators 26a and 26b has one of the first and second electrodes $26_1$ and $26_6$ electrically connected to the main magnetic pole 22.
(Third Embodiment)

Figure 7:
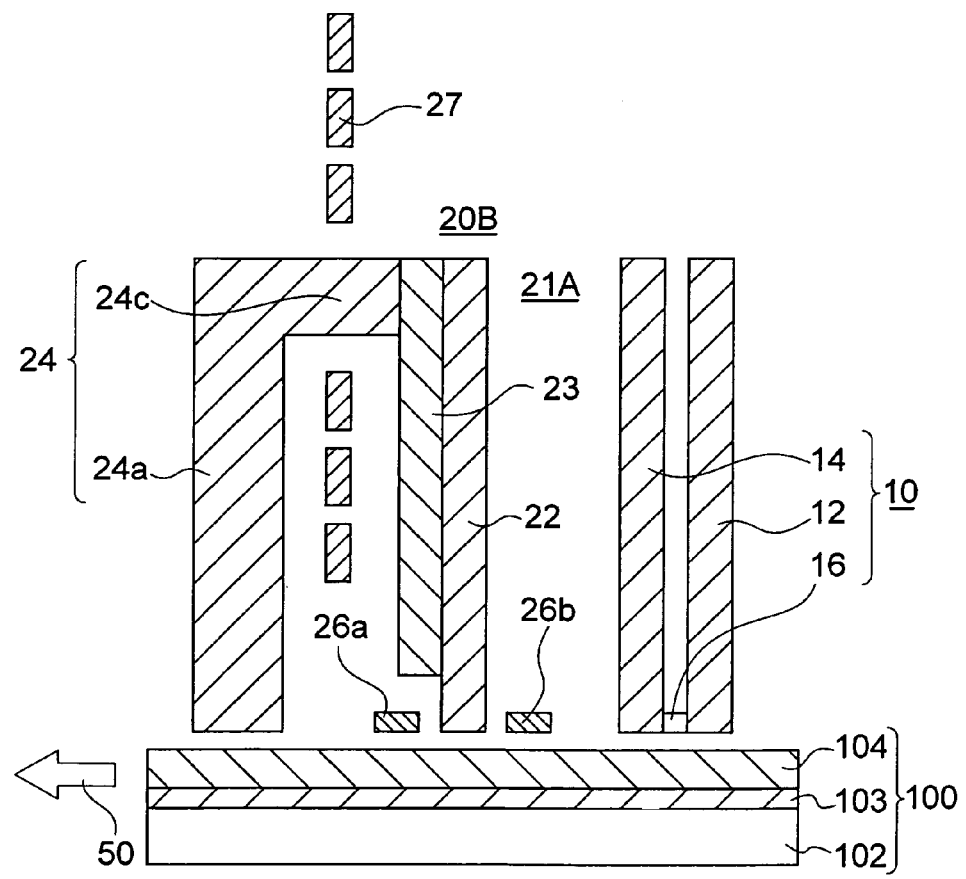
FIG. 7 is a cross-sectional view of a magnetic head according to a third embodiment, taken in the track longitudinal direction.
Figure 8:
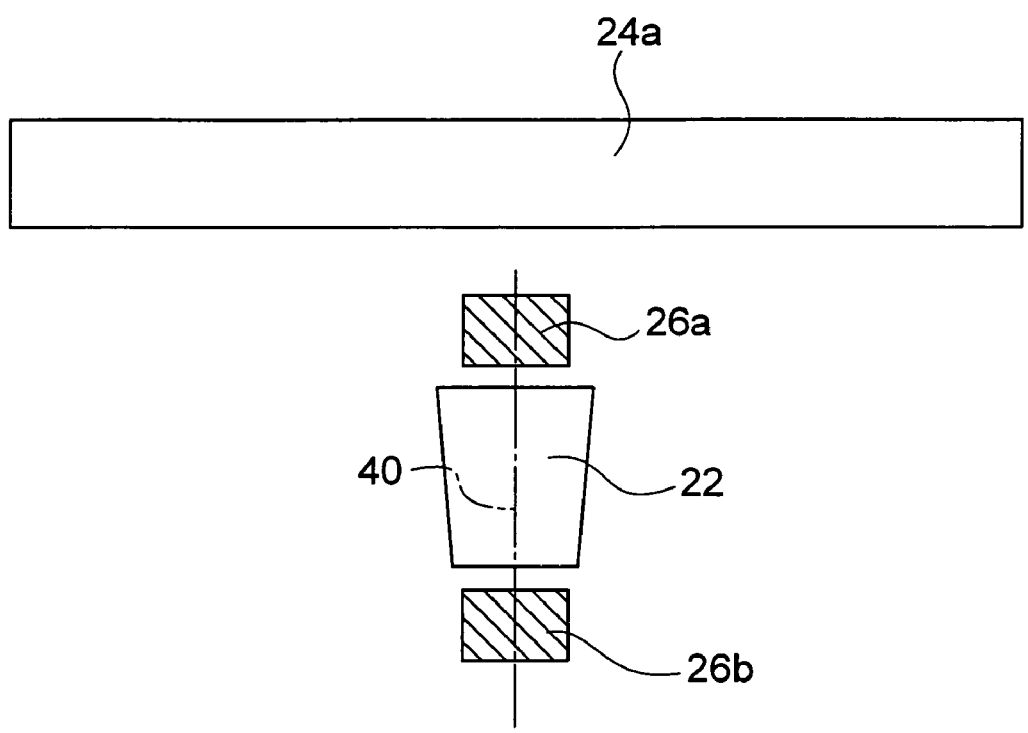
FIG. 8 is a plan view of the magnetic head of the third embodiment, seen from the magnetic recording medium side.

FIGS. 7 and 8 illustrate a magnetic head in accordance with a third embodiment of the present invention. FIG. 7 is a cross-sectional view of the magnetic head of this embodiment, taken along a plane that is perpendicular to the medium facing plane and extends in a direction (the track longitudinal direction) parallel to the moving direction of the magnetic recording medium. FIG. 8 is a plan view of the magnetic head of this embodiment, seen from the magnetic recording medium side.

The magnetic head of this embodiment is the same as the magnetic head of the first embodiment shown in FIGS. 1 and 2, except that the writing head unit 20 is replaced with a writing head unit 20B. This writing head unit 20B has a magnetic core 21A that is the same as the magnetic core 21, except that the write shield 24b of the return yoke 24 is removed. The spin torque oscillators 26a and 26b are provided on the leading side and the trailing side of the main magnetic pole 22, respectively. In FIG. 7, the moving direction of the magnetic recording medium 100 is indicated by an arrow 50.

The magnetic head of this embodiment is a so-called single-pole structure, and the write magnetic field becomes stronger in a region immediately below the recording magnetic pole. To effectively apply a high-frequency magnetic field for assistance to this portion, the two spin torque oscillators 26a and 26b are provided in the vicinities of the recording magnetic pole 22, so that the recording magnetic pole 22 is interposed between the spin torque oscillators 26a and 26b. In this structure, the spin torque oscillators 26a and 26b are located on the center line 40 of the main magnetic pole 22 at some appropriate points between the main magnetic pole 22 and the body portion 24a of the return yoke 24.

If the magnetic flux components that are short-circuited and flow from the main magnetic pole 22 to the return yoke 24 are applied too strongly onto the spin torque oscillator 26a provided between the body portion 24a of the return yoke 24 and the main magnetic pole 22, the operation of the spin torque oscillator 26a becomes unstable. To avoid this problem in this embodiment, the spin torque oscillator 26a is placed at a little distance from the recording magnetic pole 22. With this arrangement, instability due to the magnetic flux applied from the recording magnetic pole 22 can be eliminated. Also, a high-frequency magnetic field that is sufficient for assistance can be generated by placing the spin torque oscillators 26a and 26b in the vicinities of the recording magnetic pole.

As described above, this embodiment can provide a magnetic head that generates a sufficient high-frequency magnetic field for assisting recording operations.

In this embodiment, each of the spin torque oscillators 26a and 26b has one of the first and second electrodes $26_1$ and $26_6$ electrically connected to the main magnetic pole 22.

(Fourth Embodiment)

Figure 9:
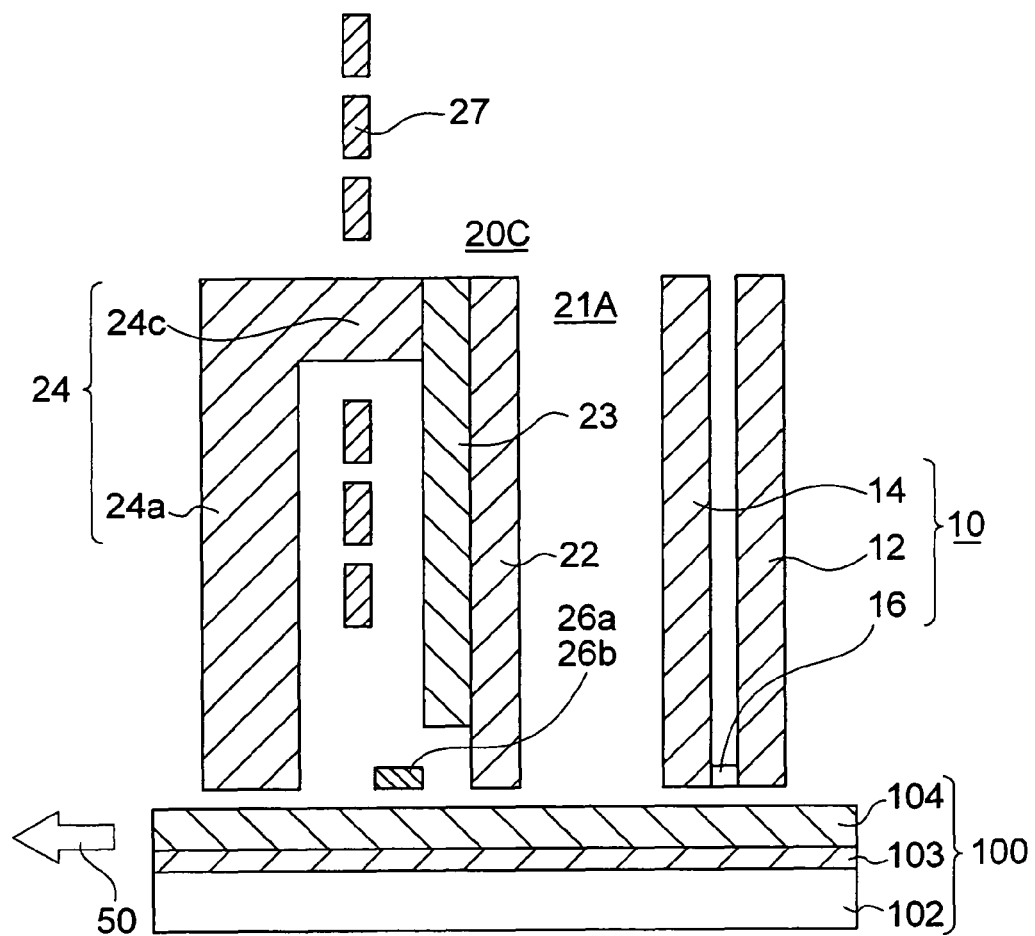
FIG. 9 is a cross-sectional view of a magnetic head according to a fourth embodiment, taken in the track longitudinal direction.
Figure 10:
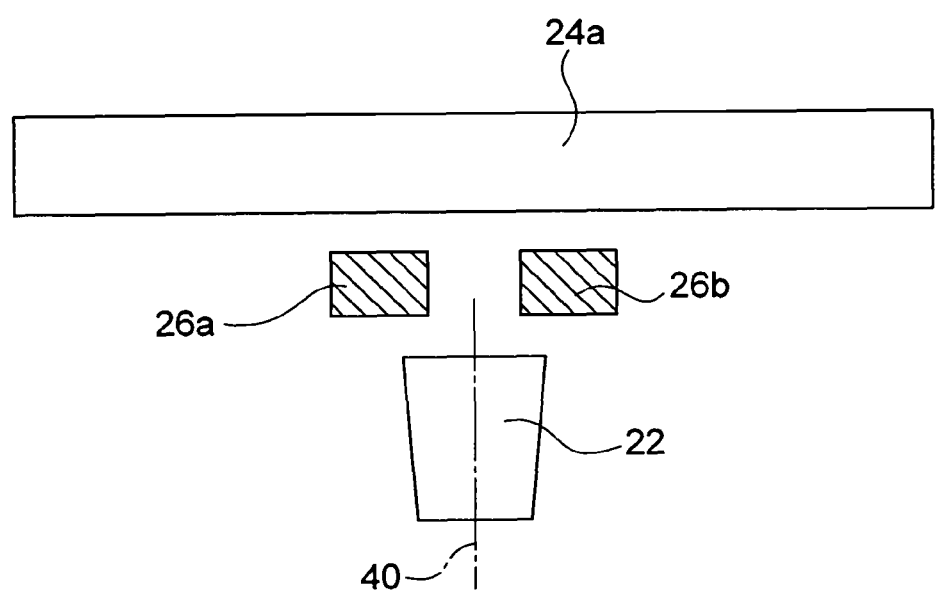
FIG. 10 is a plan view of the magnetic head of the fourth embodiment, seen from the magnetic recording medium side.

FIGS. 9 and 10 illustrate a magnetic head in accordance with a fourth embodiment of the present invention. FIG. 9 is a cross-sectional view of the magnetic head of this embodiment, taken along a plane that is perpendicular to the medium facing plane and extends in a direction (the track longitudinal direction) parallel to the moving direction of the magnetic recording medium. FIG. 10 is a plan view of the magnetic head of this embodiment, seen from the magnetic recording medium side.

The magnetic head of this embodiment is the same as the magnetic head of the third embodiment shown in FIGS. 7 and 8, except that the writing head unit 20B is replaced with a writing head unit 20C. In this writing head unit 20C, the two spin torque oscillators 26a and 26b are placed between the recording magnetic pole 22 and the body portion 24a of the return yoke 24, and are located closer to the body portion 24a.

The magnetic head of this embodiment is a so-called single-pole structure, and the write magnetic field becomes stronger in a region immediately below the recording magnetic pole. To effectively apply a transverse high-frequency magnetic field for assistance to this portion, the two spin torque oscillators 26a and 26b are provided in positions closer to the return yoke 24 than to the main magnetic pole 22.

As described above, this embodiment can provide a magnetic head that generates a sufficient high-frequency magnetic field for assisting recording operations.

Next, specific examples of the spin torque oscillators used in the first to fourth embodiments are described. A spin torque oscillator as the first specific example has already been described in the description of the first embodiment.

(Second Specific Example)

Figure 11:
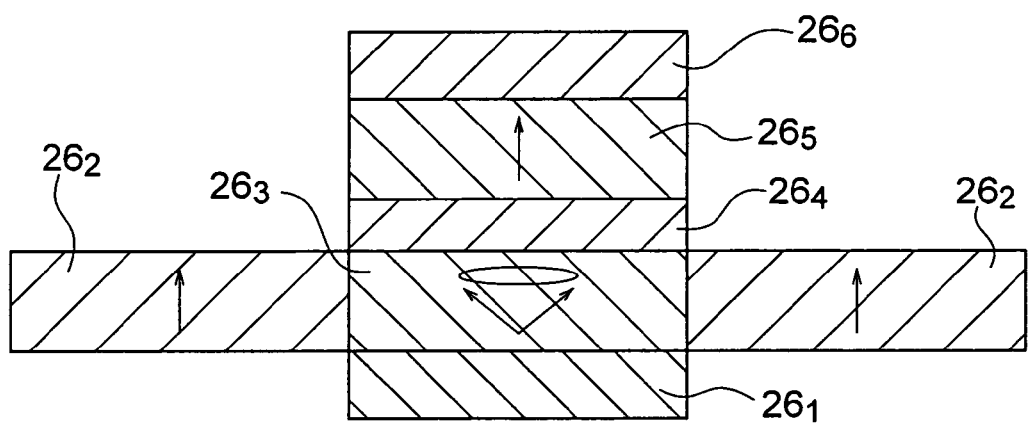
FIG. 11 is a cross-sectional view of a second specific example of a spin torque oscillator.

FIG. 11 is a cross-sectional view of a second specific example of a spin torque oscillator. In the spin torque oscillator of the second specific example, the oscillation layer $26_3$ as the second magnetic layer, the intermediate layer $26_4$, and the spin injection layer $26_5$ as the third magnetic layer are interposed between the electrodes $26_1$ and $26_6$ at the top and the bottom. One or more bias layer $26_2$ as the first magnetic layers are provided in contact with the side portions of the oscillation layer $26_3$. In FIG. 11, two bias layers $26_2$ are provided at both side portions of the oscillation layer $26_3$. In the spin torque oscillator of the second specific example, the direction of the magnetization in each of the first to third magnetic layers is substantially perpendicular to the film plane.

The above described spin torque oscillator has a smaller thickness. If this spin torque oscillator is used in the magnetic head of the first embodiment illustrated in FIGS. 1 and 2, the write gap, or the distance between the main magnetic pole 22 and the write shield 24b, can be narrower.

(Third Specific Example)

Figure 12:
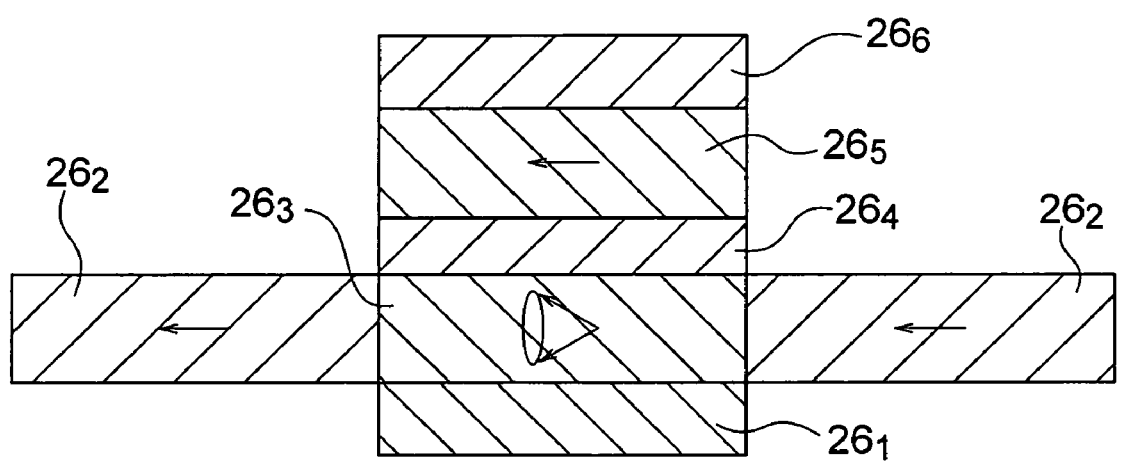
FIG. 12 is a cross-sectional view of a third specific example of a spin torque oscillator.

FIG. 12 is a cross-sectional view of a third specific example of a spin torque oscillator. The spin torque oscillator of the third specific example differs from the spin torque oscillator of the second specific example in that the direction of magnetization in each magnetic layer is substantially parallel to the film plane. In the spin torque oscillator of the third specific example, the oscillation characteristics, such as the current and the oscillation frequency required for oscillations, are different from those of the spin torque oscillator of the second specific example. Therefore, a spin torque oscillator that is suitable for the magnetic materials used as the oscillation layer and the spin injection layer or the type of magnetic recording medium to be used together should be employed.

The materials used for the respective layers in the spin torque oscillators of the second and third specific examples may be the same as those used in the spin torque oscillator described as the first specific example in the first embodiment illustrated in FIG. 3.

(Fourth Specific Example)

Figure 13:
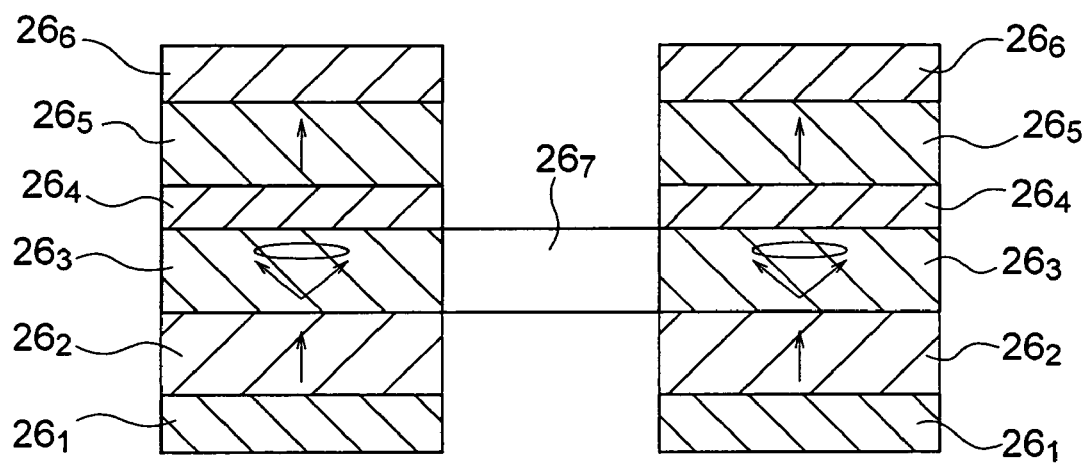
FIG. 13 is a cross-sectional view of a fourth specific example of a spin torque oscillator.

FIG. 13 is a cross-sectional view of a fourth specific example of a spin torque oscillator. The spin torque oscillator of the fourth specific example can be used in the magnetic head of the first embodiment or its modification or in the magnetic head of the fourth embodiment. This spin torque oscillator of the fourth specific example includes two stacked structures of the spin torque oscillator of the first specific example shown in FIG. 3, and an exchange coupling layer $26_7$ formed with a magnetic layer is provided between the oscillation layers $26_3$ of those stacked structures.

This exchange coupling layer $26_7$ may be made of a magnetic metal such as Fe, Co, or Ni, or an alloy containing one of those metals. However, it is preferable that the exchange coupling layer $26_7$ is formed with the same magnetic layer as each of the oscillation layers $26_3$. The exchange coupling layer $26_7$ is exchange-coupled to the magnetization of each of the oscillation layers $26_3$. When the magnetizations of the two oscillation layers $26_3$ oscillate, the oscillations are synchronous with each other, since the magnetizations of the two oscillation layers $26_3$ are exchange-coupled to each other via the exchange coupling layer $26_7$. Accordingly, it is possible to obtain the largest sum of high-frequency magnetic fields generated from the magnetizations of the oscillation layers $26_3$.

(Fifth Embodiment)

Next, a magnetic recording and reproducing device in accordance with a fifth embodiment of the present invention is described. The magnetic head of each of the embodiments of the present invention and their modifications described with reference to FIGS. 1 to 13 can be incorporated into a magnetic head assembly of an integrated recording and reproducing type, and can be mounted on a magnetic recording and reproducing device.

Figure 14:
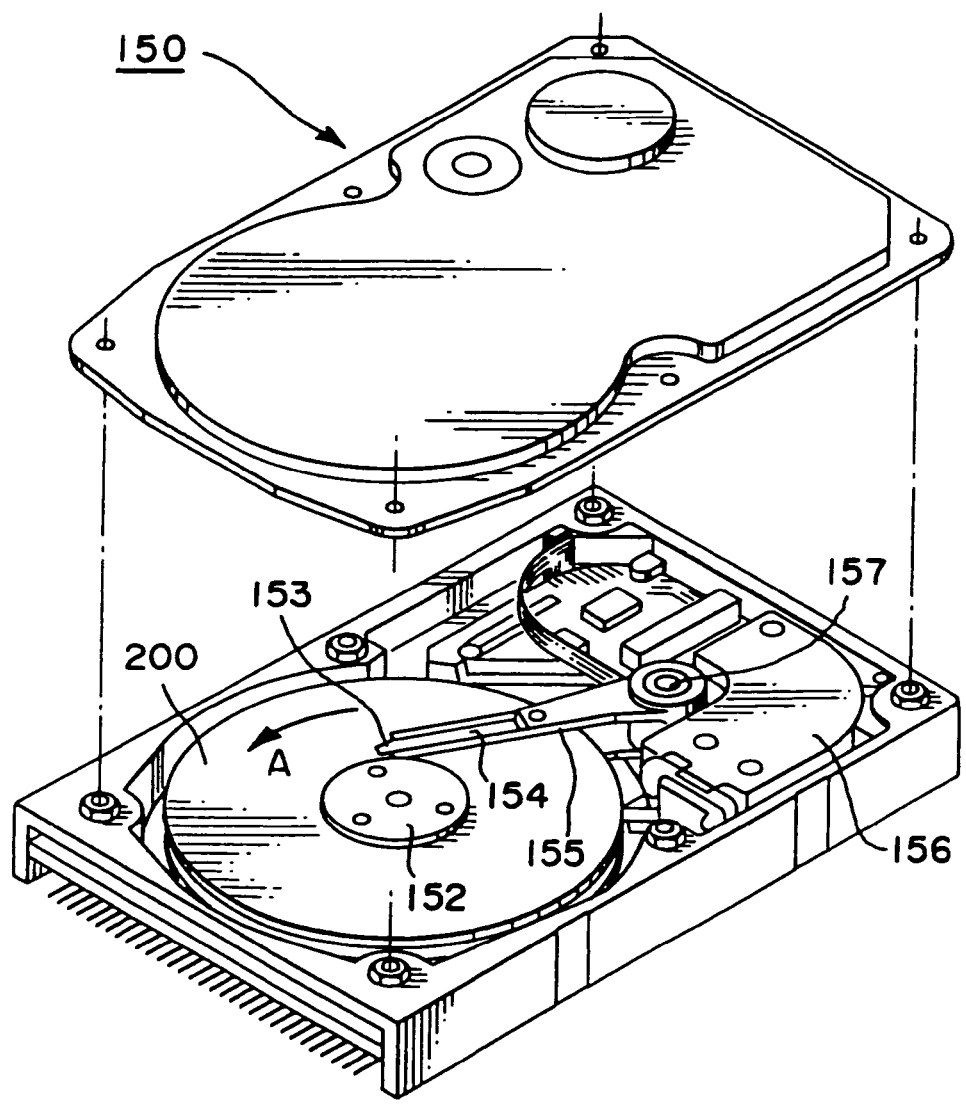
FIG. 14 is a perspective view of a magnetic recording reproducing device in accordance with a fifth embodiment of the present invention.

FIG. 14 is a schematic perspective view showing the components of such a magnetic recording device. The magnetic recording and reproducing device 150 of this embodiment is a device with a rotary actuator. In FIG. 14, a longitudinal-direction or vertical-direction recording magnetic disk 200 is mounted onto a spindle 152, and is rotated in the direction of the arrow A by a motor (not shown) that responds to a control signal supplied from a driving device controller (not shown). The magnetic disk 200 is a two-layer magnetic recording medium that has a perpendicular recording layer and a soft-magnetic backing layer. A head slider 153 that reproduces the information recorded on the magnetic disk 200 is attached to the top end of a thin-film suspension 154. Here, the head slider 153 has a magnetic head of one of the embodiments in the vicinity of the top end.

When the magnetic disk 200 is rotated, the air bearing surface (ABS) of the head slider 153 is maintained at a predetermined floating distance from the surface of the magnetic disk 200.

The suspension 154 is connected to one end of an actuator arm 155 that has a bobbin portion for holding a driving coil (not shown). A voice coil motor 156 that is a kind of a linear motor is attached to the other end of the actuator arm 155. The voice coil motor 156 is formed with the driving coil (not shown) wound around the bobbin portion of the actuator arm 155, and a magnetic circuit that includes a permanent magnet and a facing yoke that face each other and sandwich the driving coil.

The actuator arm 155 is held by ball bearings (not shown) provided at an upper portion and a lower portion of a fixed axis 157, and can freely rotate and slide by virtue of the voice coil motor 156.

Figure 15:
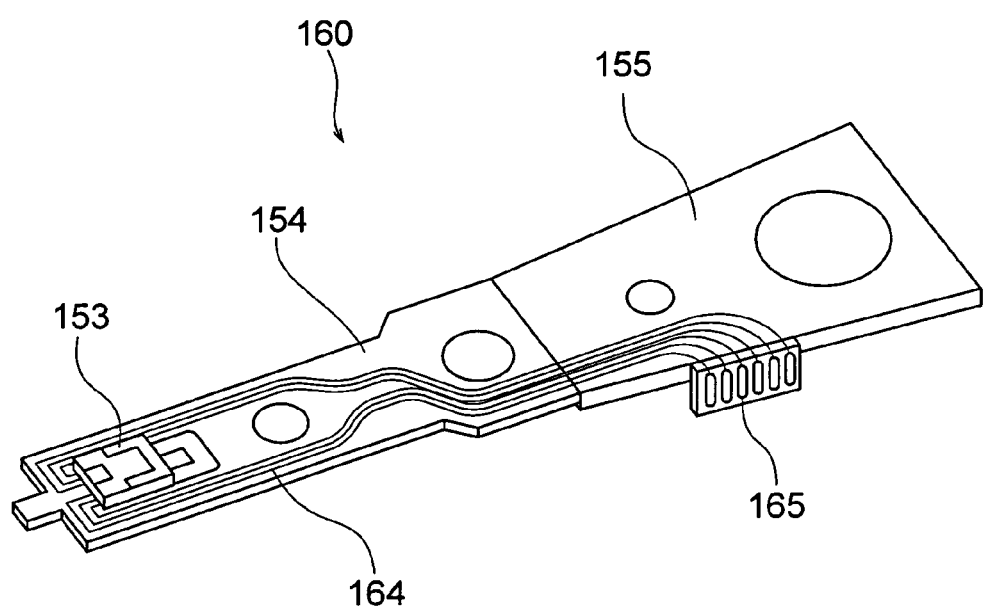
FIG. 15 is a perspective view of the magnetic recording reproducing device of the fifth embodiment, seen from the disk side toward the magnetic head assembly above the actuator arm.

FIG. 15 is an enlarged perspective view of the top portions of the magnetic head assembly including the actuator arm 155, seen from the disk side. The magnetic head assembly 160 includes the actuator arm 155 having the bobbin portion for holding the driving coil, for example. The suspension 154 is connected to one end of the actuator arm 155.

The head slider 153 having one of the reproducing magnetic head described with reference to FIGS. 1 to 13 is attached to the top end of the suspension 154. The suspension 154 has lead lines 164 for the spin torque oscillator and for signal writing and reading. The lead lines 164 are electrically connected to the respective electrodes of the magnetic head incorporated into the head slider 153. In FIG. 22, reference numeral 165 indicates electrode pads of the magnetic head assembly 160.

Here, the predetermined floating distance is maintained between the air bearing surface (ABS) of the head slider 153 and the surface of the magnetic disk 200.

The embodiments of the present invention have been described so far by way of specific examples. However, the present invention is not limited to those specific examples. For example, magnetic recording media that can be used in the present invention are not limited to the magnetic recording medium 100 shown in FIGS. 1 to 13, and any magnetic recording medium having a recording layer and a soft magnetic layer can be used to achieve the same effects as the above described effects. More specifically, it is possible to use a discrete track medium that has tracks arranged in parallel with one another and nonmagnetic portions provided between the adjacent tracks, or a discrete bit medium that has magnetic bits and nonmagnetic portions provided between the magnetic bits.

Also, the materials and shapes of the components of magnetic heads are not limited to those described as the specific examples, and any materials and shapes that can be selected by those skilled in the art can be used to achieve the same effects as above.

Also, magnetic recording media that can be used in magnetic recording and reproducing devices are not limited to hard disks, but any other magnetic recording media such as flexible disks and magnetic cards can be used. Further, it is possible to employ a so-called "removable"-type device from which a magnetic recording medium can be detached.

Figure 16:
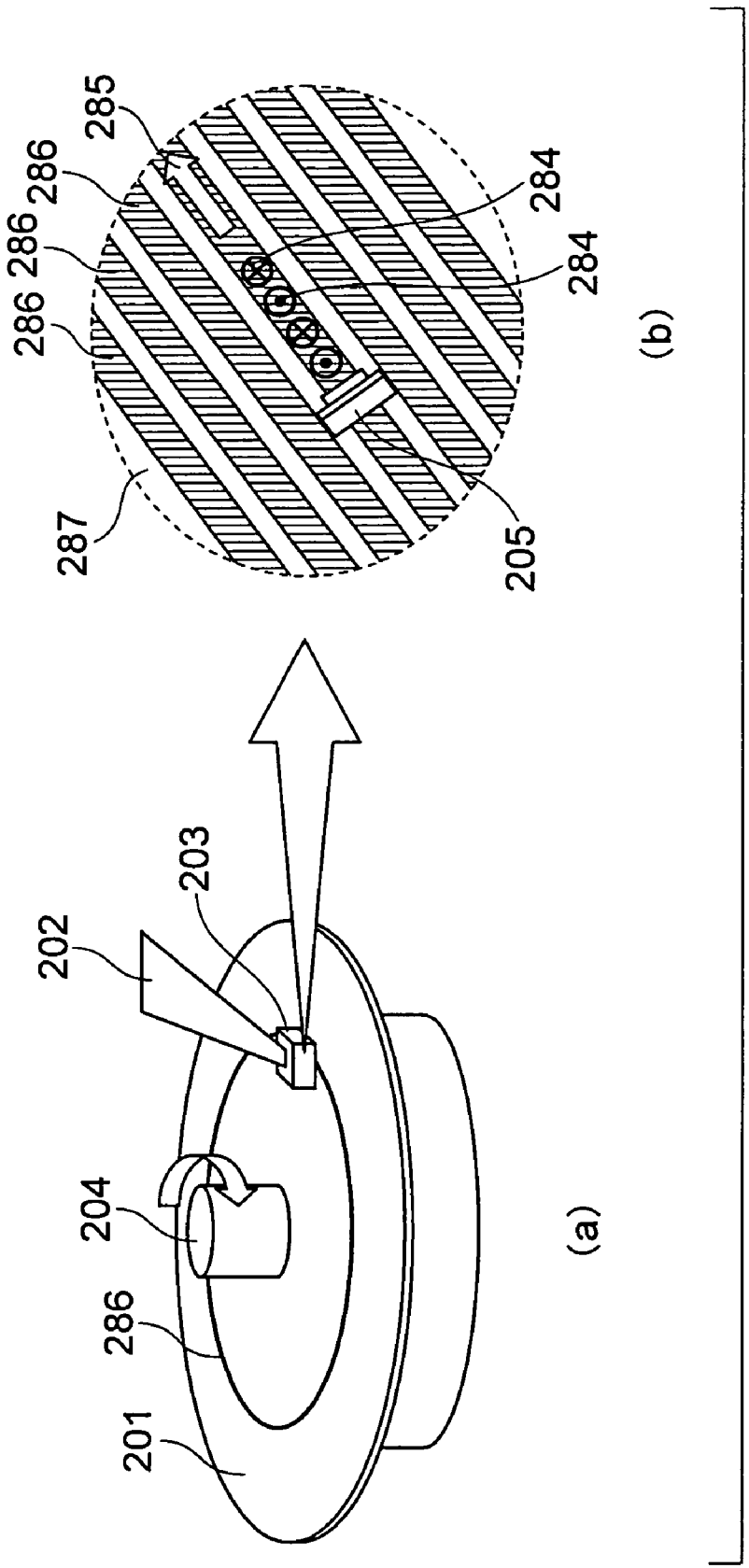
FIGS. 16(a) and 16(b) illustrate a discrete-track magnetic recording medium that can be used in each of the embodiments.

FIGS. 16(a) and 16(b) show a specific example of a magnetic recording medium that can be used in each of the above described embodiments. The magnetic recording medium 201 in this specific example is a discrete magnetic recording medium having multiparticle magnetic discrete tracks 286 that are separated from one another by nonmagnetic portions (or air portions) 287 and are vertically oriented. When this medium 201 is rotated by a spindle motor 204 and is moved in the medium running direction 285, recorded magnetized portions 284 can be formed by a magnetic recording head 205 mounted onto a head slider 203. The head slider 203 is attached to the top end of a suspension 202. This suspension 202 has lead lines for signal writing and reading, and the lead lines are electrically connected to the electrodes of the magnetic head 205 incorporated into the head slider 203.

The width (TS) of the spin oscillator in the recording track width direction is made equal to or greater than the width (TW) of each of the recording tracks 286 and equal to or smaller than the recording track pitch (TP), so that a decrease in the coercivity of the adjacent recording tracks due to the leakage high-frequency magnetic field generated from the spin oscillator can be effectively restricted. Accordingly, in the magnetic recording medium in this specific example, high-frequency assisted magnetic recording can be performed effectively only on desired recording tracks 286.

In this specific example, a high-frequency assisted recording device having narrow tracks and a high track density is more readily realized than in a case where a multiparticle vertical medium of a so-called "no-gap film type" is used. Also, in a conventional magnetic recording head, an unwritable medium magnetic material with high magnetic anisotropic energy (Ku), such as FePt or SmCo, is used according to the high-frequency assisted magnetic recording method, so as to further reduce the nanometer size of the medium magnetic particles. In this manner, a magnetic recording medium having a much higher line recording density in the recording track direction (the bit direction) than a conventional magnetic recording medium can be obtained.

Figure 17:
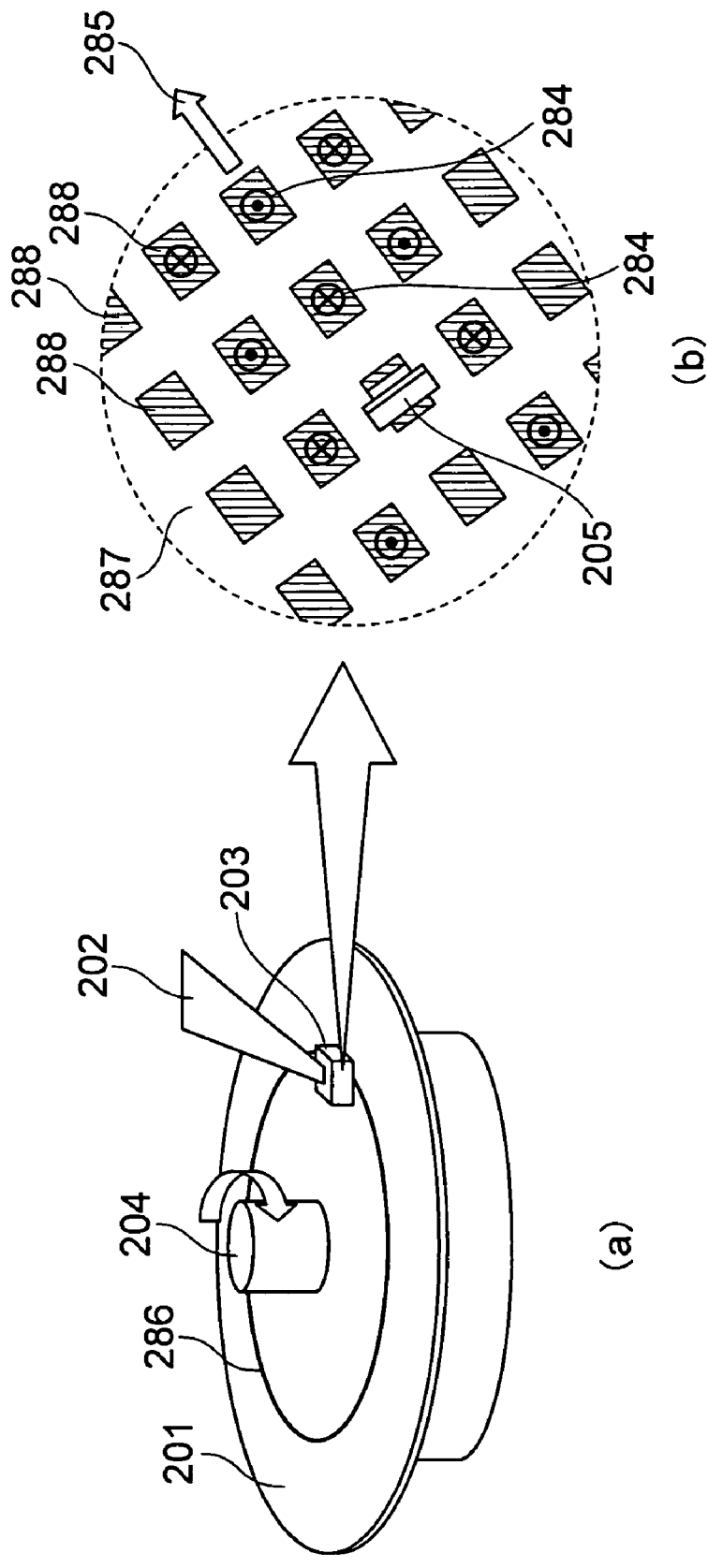
FIGS. 17(a) and 17(b) illustrate a discrete-bit magnetic recording medium that can be used in each of the embodiments.

FIGS. 17(a) and 17(b) are schematic views showing another example of a magnetic recording medium that can be used in each of the above embodiments. The magnetic recording medium 201 in this specific example is a discrete bit magnetic recording medium that has magnetic discrete bits 288 separated from one another by a nonmagnetic portion 287. When this medium 201 is rotated by the spindle motor 204 and is moved in the medium running direction 285, recorded magnetized portions 284 can be formed by the magnetic recording head 205 mounted onto the head slider 203.

As shown in FIGS. 16(a) through 17(b), with any of the magnetic heads of the above described embodiments, recording can be accurately performed on the recording layer with high coercivity on the magnetic recording medium 201 of the discrete track type or the discrete bit type. Thus, high-density and high-speed magnetic recording can be performed.

In this specific example, the width (TS) of the spin oscillator in the recording track width direction is made equal to or greater than the width (TW) of each of the recording tracks 286 and equal to or smaller than the recording track pitch (TP), so that a decrease in the coercivity of the adjacent recording tracks due to the leakage high-frequency magnetic field generated from the spin oscillator can be effectively restricted. Accordingly, high-frequency assisted magnetic recording can be performed effectively only on desired recording tracks 286. With this embodiment, there is a possibility that a high-frequency assisted magnetic recording medium with a recording density of 10 Tbits/inch$^2$ or higher can be realized by giving high magnetic anisotropic energy (Ku) to the magnetic dots 288 and reducing the size of the magnetic dots 288, as long as the resistance to heat fluctuations is maintained in the usage environment.

As described so far, each of the embodiments of the present invention can provide a magnetic head that generates a sufficient high-frequency magnetic field for assisting recording operations, and a magnetic recording device that includes the magnetic head.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

What is claimed is:

1. A magnetic head comprising:
 a recording magnetic pole;
 a return yoke magnetically coupled to the recording magnetic pole; and
 at least two spin torque oscillators provided on a first plane parallel with a medium facing plane of the recording magnetic pole and arranged in parallel with each other, the spin torque oscillators being disposed between a face of the recording magnetic pole on one side of a gap and a face of the return yoke on another side of the gap, the gap being between the recording magnetic pole and the return yoke, and the spin torque oscillators being respectively disposed on opposite sides of a center line of the recording magnetic pole, the center line extending across the gap.

2. The head according to claim 1, wherein the spin torque oscillators are disposed in positions substantially symmetrical about the center line of the recording magnetic pole.

3. The head according to claim 1, further comprising
 a write shield disposed between the recording magnetic pole and the return yoke, the gap being formed between the recording magnetic pole and the write shield.

4. The head according to claim 3, further comprising
 a side shield that is provided at either side portion of the recording magnetic pole.

5. The head according to claim 1, wherein each of the spin torque oscillators has a pair of electrodes for energization, one of the electrodes being electrically connected to the recording magnetic pole.

6. The head according to claim 1, wherein the spin torque oscillators are disposed in positions closer to the return yoke than to the recording magnetic pole.

7. The head according to claim 1, wherein each of the spin torque oscillators is a stacked structure that includes a first magnetic layer, a second magnetic layer, an intermediate layer, and a third magnetic layer.

8. A magnetic recording device comprising the magnetic head according to claim 1.

9. The device according to claim 8, wherein the spin torque oscillators are disposed in positions substantially symmetrical about the center line of the recording magnetic pole.

10. The device according to claim 8, further comprising
 a write shield that is provided between the recording magnetic pole and the return yoke, the gap being formed between the recording magnetic pole and the write shield.

11. The device according to claim 10, further comprising
 a side shield that is provided at either side portion of the recording magnetic pole.

12. The device according to claim 8, wherein each of the spin torque oscillators has a pair of electrodes for energization, one of the electrodes being electrically connected to the recording magnetic pole.

13. The device according to claim 8, wherein the spin torque oscillators are placed in positions closer to the return yoke than to the recording magnetic pole.

14. The device according to claim 8, wherein each of the spin torque oscillators is a stacked structure that includes a first magnetic layer, a second magnetic layer, an intermediate layer, and a third magnetic layer.

15. A magnetic head, comprising:
 a recording magnetic pole;
 a return yoke magnetically coupled to the recording magnetic pole; and
 at least two spin torque oscillators provided on a first plane parallel with a medium facing plane of the recording magnetic pole and arranged in parallel with each other,
 wherein the spin torque oscillators are respectively disposed in vicinities of two side faces of the recording magnetic pole, the two side faces not including a first face of the recording magnetic pole on one side of a gap between the recording magnetic pole and the return yoke, and the two side faces also not including a second face of the recording magnetic pole opposite from the magnetic gap.

16. A magnetic recording device comprising the magnetic head according to claim 15.

* * * * *